R. S. BLAIR.
MEASURING APPARATUS.
APPLICATION FILED MAY 31, 1907. RENEWED SEPT. 26, 1917.
1,244,693. Patented Oct. 30, 1917.
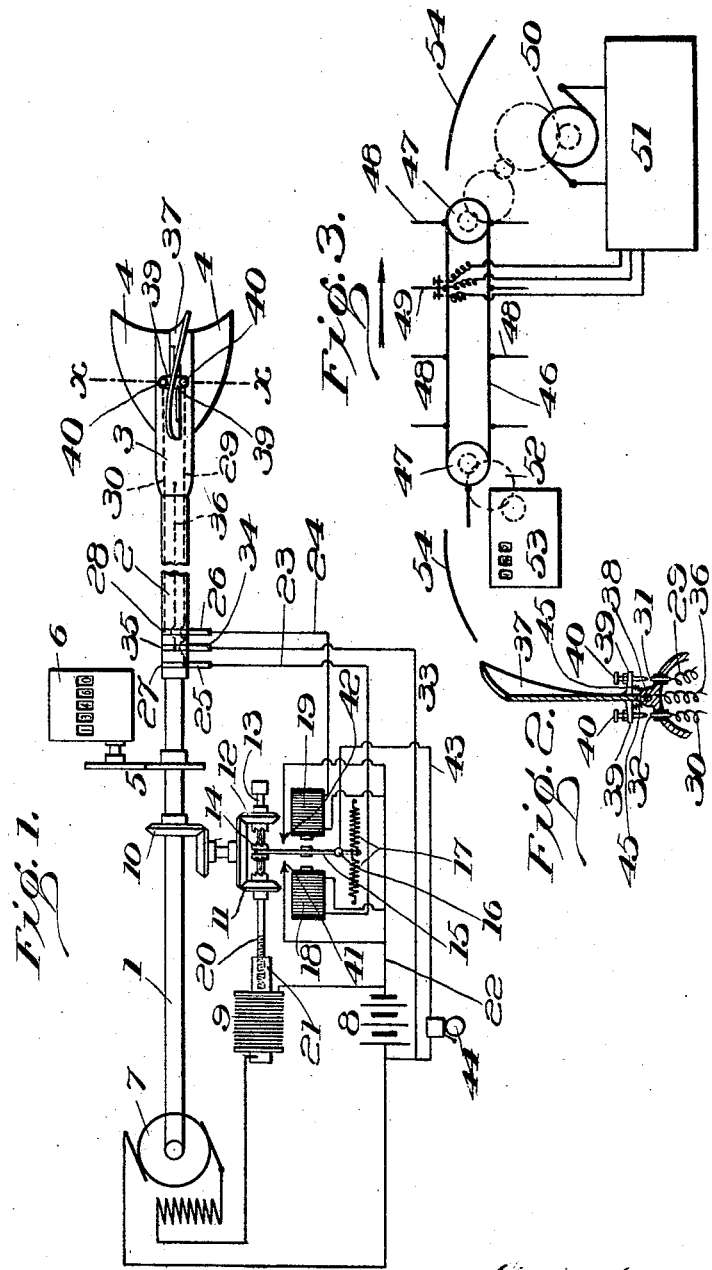

United States Patent Office.

ROBERT S. BLAIR, OF NEW ROCHELLE, NEW YORK.

MEASURING APPARATUS.

1,244,693.  Specification of Letters Patent.  Patented Oct. 30, 1917.

Application filed May 31, 1907, Serial No. 376,635.   Renewed September 26, 1917.  Serial No. 193,399.

*To all whom it may concern:*

Be it known that I, ROBERT S. BLAIR, a citizen of the United States, residing at New Rochelle, in the county of Westchester and State of New York, have invented certain new and useful Improvements in Measuring Apparatus, of which the following is a full, clear, and exact description, such as will enable others skilled in the art to which it appertains to make and use the same.

This invention relates to measuring apparatus. One of the objects is to provide a simple, efficient and accurate means for measuring the rate of relative flow of a fluid. Another object is to provide a practical ship's log characterized by reliable indication of speed or distance. Another object is to provide means in connection with apparatus for measuring fluid flow for doing away with the necessity of calibration or empirical formulæ. Other objects will be in part obvious and in part pointed out hereinafter.

The invention accordingly consists of the features of construction and combinations and arrangements of parts which will be exemplified in the apparatus hereinafter described and the scope of the application of which will be pointed out in the following claims. In the accompanying drawing wherein are shown one or more of various possible embodiments of certain features of this invention, Figure (1) is a diagrammatic elevation of one of the same, Fig. (2) is a sectional view taken substantially on the line X—X of Fig. (1) and showing a detail of construction of this portion of the apparatus, Fig. (3) is a diagrammatic view of a slightly different embodiment of certain features of the invention. Similar reference characters refer to similar parts throughout the several views of the drawing.

In order that certain features of this invention may be the more readily and fully understood, it may here be noted that in the measurement of fluid flow as in the case of ships' logs, water current meters and anemometers it is the general custom to calibrate these instruments by using them in a fluid current of known speed. This is more or less inaccurate and uncertain, not only on account of the difficulty of measuring the rate of flow of the fluid during calibration, but also on account of the changes which may occur in the instrument, as in the case of lubrication of bearings of moving parts.

Also it may be noted that measurements through instruments used in connection with empirical formulæ are uncertain and unreliable as same are rarely of general application. The accurate measurement of current flow is nevertheless often of a high degree of importance, and the provision of apparatus for achieving this end is among the dominant aims of this invention.

Referring now to the accompanying drawings there is shown a shaft (1) to which is connected a cable, (2) having at its end a cylindrical member, (3) provided with blades, (4), these parts being of the general form common in the case of ships' logs. Connected with shaft (1) as by gearing (5) is indicating or recording apparatus (6) whereby the number of revolutions of the shaft is recorded and through a proper calculation in which time is introduced as a factor the speed of the shaft in revolutions per minute can be computed. Fixed upon shaft (1) is a source of power, (7), taking in this case the form of a series wound electric motor connected with a battery or other source of current, (8), and having disposed within its circuit a variable resistance, (9) which preferably comprises a pile of carbon disks. Fixed upon shaft (1) is a bevel pinion (10) driving through suitable bevel gearing the pinions (11) and (12) which are loosely mounted upon a spindle (13). Pinions (11) and (12) are provided upon their adjacent surface with clutch members each of which is adapted to engage a similarly formed double face clutch member, (14) which is splined on shaft (13) and is normally held in midposition by the lever, (15) pivoted at (16) and having connected with its remote end the springs (17). Upon opposite sides of lever (15) are electrical magnets (18) and (19) adapted alternatively to attract this lever as an armature to throw the clutch (14) into engagement with the clutch portion of the corresponding pinion (11) or (12). Upon this action occurring, if it be assumed that shaft (1) is in rotation the shaft (13) will be revolved in one or the other direction in accordance with the pinion (11) or (12) which is in action and through a threaded connection (20) with an abutment (21) the pressure upon the carbon disks (9) is increased or diminished with a corresponding acceleration or retardation of parts driven by the motor (7). A conductor (22) leads from one pole of battery (8) to each of the magnets (18) and (19) and the remaining end of these solenoids are led by conductors (23) and (24) respectively to contact brushes (25) and (26). These brushes rest against contact rings (27) and (28) upon the cable (2) and from these rings conductors (29) and (30) lead to terminals (31) and (32) best shown by Fig. (2) of the drawing.

From the remaining pole of the battery a conductor (33) leads to the contact brush (34) and contact ring (35) to the conductor (36) within the cable (2) terminating upon the metallic body portion (3) above described. It is to be understood that the conductors (29), (30) and (36) are insulated throughout their entire length to the points at which they terminate.

Referring now particularly to Fig. (2) of the drawings there is shown a blade (37) which is pivotedly mounted as at (38) to swing laterally in either direction. This blade is provided with lugs (39) each of which has a set screw (40) and these parts are so formed and positioned as upon the blade swinging in either direction or the other to complete a circut between the conductor (36) and terminal (31) or (32).

There is also provided adjacent the lever (15) a pair of contacts (41) and (42) both of which are connected with one pole of the battery whereas the pivot (16) of this lever is connected through conductor (43) and bell (44) with the remaining end of the battery and thus upon either magnet becoming energized indicate such contact by the ringing of the bell. The cable may then be, if desired, speeded up or slowed down by hand, but there are obvious advantages in the automatic construction above described.

Considering now more in detail the action of the pivoted propeller blade (37) it is to be noted that the same is so formed as at all portions to have exactly the same pitch thus necessitating a close approach to parallelism with its axis in the portions adjacent its center of revolution and the pivot is shown here as substantially parallel to the axis but it is to be understood that the same is slightly inclined thereto so as to have the same pitch distance as the outer portions of the blade. The outer part is normally held in a predetermined position as by the light springs (45) and the set screws (40) are so adjusted as upon the blade swinging in either direction to complete the circuit through the corresponding magnet (18) or (19) as above described.

The operations of the above described apparatus is substantially as follows:—

Assuming the log comprising portion (3) and blades (4) to be drawn astern of a vessel in the customary manner, the same will be given a rotary movement due to the action of the water upon the blades (4). There will be, however, a slight so called "slip" due to the friction of the parts and energy consumed in moving them and thus the number of revolutions times the pitch of the blade will not in ordinary instruments give the distance traveled.

In the present case, however, energy is supplied to the shaft (1) and thus to the cable (2) by the motor (7) and this energy is controlled in such a manner as exactly to do away with the slip; thus if there is a tendency of the blade to be drawn through the water at a rate faster than that given by its pitch distance times its number of revolutions per minute, there will be a lateral component exerted upon its forward side tending to swing it and complete a circuit through one of the magnets (18) or (19). The value of resistance (9) is thus changed and thread (20) being of a proper form, the motor (7) speeded up until the pressures upon both sides of the swinging blade are balanced, and thus give a true indication of the rate of travel of the vessel. If on the other hand the motor tends to drive the log too fast, there will be a forward pressure upon the pivotal blade as in the case of a screw propeller and it will be swung in the opposite direction with a consequent change of the value of the resistance (9) and slowing down of the motor. The rate of revolution of the blade thus is so governed as to do away with any lateral pressure upon either of its flat surfaces, and when this state of affairs exists it travels through the water at each revolution a distance exactly equal to its pitch and the rate of travel or distance of the vessel can be readily computed. It is to be understood that the resistance of the circuits are so proportioned as to prevent short circuiting of the terminals by the water as at the set screws (40) and to govern the rate of rotation of the motor (7) in such a manner as, reducing gearing being employed if necessary, to bring about the desired rate of drive.

It may here be noted that the term "slip" is used throughout this description and the following claims in its nautical sense as denoting the difference between the distance traveled by a boat at one revolution to its paddle or propeller and the distance which it should have traveled theoretically, namely the pitch of the propeller blades or the circumference of its paddle wheels.

In Fig. three (3) of the drawings there is shown another type of apparatus embodying some features of this invention in which an endless belt (46) is mounted upon pulleys (47) and is provided with vanes (48) extended at right angles to the pulley. One of these vanes, namely (49), is pivoted to the pulley and is provided with suitable electrical connections in such a manner that upon swinging in either direction it will either speed up or slow down the driving motor (50) connected with one of the pulleys (47). This regulating apparatus is diagrammatically indicated at (51) and is substantially identical with that above described in detail. Connected with the remaining pulley (47) by suitable gearing (52) is an indicator (53) to show the rate of travel of the pulley and there are provided shields (54) to protect all of the apparatus except the outer moving parts which are exposed to the current as indicated by the heavy arrows.

The operation of this type of apparatus is as follows:—

The belt (46) is speeded up until vane (49) has no tendency to swing in either direction and it is thus obvious that it is traveling at substantially the same rate as the current in which lies. Clearly, if traveling at a greater rate it would tend to lag, whereas if moving not so swiftly there would be a tendency to force it forward.

The belt (46) is thus moving at a rate of travel of the wind or other fluid current, and this rate may be readily ascertained as by the indicating apparatus (53).

It will thus be seen that there is provided an apparatus in which the objects of this invention are achieved and the advantages hereinbefore enumerated are present. The apparatus is of simple and inexpensive construction and its action is accurate and reliable inasmuch as it employs a so-called null method. The accuracy of action may effectually be enhanced by disposing the pivot about which the blade swings in the first described construction part way up the blade and thus reducing the practicably negligible value of the effect of its edge resistance. This, however, as is the case with many other refinements of construction will be clear from this description to those skilled in the art. The entire apparatus is reliable, efficient and although it may be hand actuated is preferably largely automatic and is susceptible of a wide range of practical and scientific application.

As many changes could be made in the above construction, and as various possible embodiments thereof could be made without departing from the scope of this invention, it is intended that all matter herein described or shown in the accompanying drawing shall be interpreted as illustrative and not in a limiting sense.

Having described my invention and what I claim as new and desire to secure by Letters Patent of the U. S. is:

1. In apparatus of the class described, in combination, electrically controlled indicating means, means comprising a movable member adapted to be exposed to a fluid moving relative to said indicating means and adapted to be moved by the relative movement of said fluid, and means controlled from said movable member adapted to affect said indicating means upon a slip of said second means relative to said fluid occurring and thereby indicate when said slip occurs.

2. In apparatus of the class described, in combination, indicating means, means comprising a movable member adapted to be exposed to a fluid moving relative to said indicating means and adapted to be moved by the relative movement of said fluid, and means controlled from said movable member adapted to affect said indicating means upon a slip of said second means in either direction relative to said fluid occurring.

3. In measuring apparatus, in combination, a device adapted to be exposed to a fluid current and driven thereby, said device comprising a part sensitive to inequality of pressures upon its forward and rear surfaces, a source of power, means connecting said source of power to said device whereby said source of power tends to drive said device, and means controlling the speed of said source of power from said pressure-sensitive part to maintain said pressures substantially equal.

4. In apparatus of the class described, in combination, means having a part sensitive to unbalanced pressures thereon adapted to be exposed to a fluid current and adapted to be driven thereby, an auxiliary source of power connected with said first means, and means controlled from said part and adapted automatically to control said auxiliary source of power in accordance with the tendency to slip of said first mentioned means.

5. In measuring apparatus, in combination, a source of power, a device adapted to be exposed to fluid current and sensitive to inequality of pressures upon its opposite sides, a connection from said source of power to said device whereby said source of power is adapted to move said device, and means controlling said source of power from said device in accordance with inequality of said pressures.

6. In apparatus of the class described, in combination, a rotatably mounted member set at an angle with its axis of rotation and adapted to be exposed upon both sides to a fluid current, and means adapted to indicate unbalanced lateral pressure in either direction upon said member.

7. In apparatus of the class described, in combination, a rotatably mounted member set at an angle with its axis of rotation and adapted to be exposed upon both sides to a fluid current, and an electrically controlled means adapted to indicate unbalanced lateral pressure in either direction upon said member.

8. In apparatus of the class described, in combination, a rotatably mounted member set at an angle with its axis of rotation and adapted to be exposed to a fluid current and to tend to be rotated thereby, an auxiliary source of power adapted to tend to drive said rotatably mounted member, and means controlled by unbalanced lateral pressure upon said member adapted to control said source of power to relieve said pressure.

9. In apparatus of the class described, in combination, a rotatably mounted member set at an angle with its axis of rotation and adapted to be exposed to a fluid current, means adapted to apply power to and tend to drive said member, and means automatically controlled in accordance with unbalanced lateral pressure upon said member adapted to control automatically said power applying means.

10. In apparatus of the class described, in combination, a rotatably mounted member set at an angle with its axis of rotation and adapted to be exposed to a fluid current, a motor connected with and adapted to rotate said member, and means comprising an electrical means controlled in accordance with unbalanced lateral pressure upon said member and adapted to control the rate of drive of said motor.

11. In apparatus of the class described, in combination, a rotary ship's log provided with a hinged blade, means adapted to tend to rotate said log, and means controlled by said hinged blade adapted to accelerate or retard said first mentioned means as said hinged blade tends to swing in one or another direction.

12. In apparatus of the class described, in combination, a rotary ship's log provided with a hinged blade, a pair of electrical circuits adapted alternatively to be completed in accordance with the direction of swinging of said blade, a pair of magnets respectively positioned in said circuits, and means comprising an electric motor controlled by said magnets and controlling the rate of said drive of said log.

13. In apparatus of the class described, in combination, a rotary ship's log provided with a hinged blade, a pair of electrical circuits adapted alternatively to be completed in accordance with the direction of swinging of said blade, a pair of magnets respectively positioned in said circuits, and means comprising an electric motor controlled by said magnets and controlling the rate of drive of said log, said means comprising a variable resistance in the circuit of said motor, and means for varying said resistance deriving power from said motor.

14. In apparatus of the class described, in combination, a rotary ship's log, a cable, an electric motor connected with and adapted to tend to drive said cable, said log being provided with means adapted to move in one or another direction in accordance as its slip has a positive or negative value, a pair of electric circuits adapted respectively to be completed by said means, a pair of magnets respectively disposed in said circuits, a variable resistance in circuit with said motor, and means deriving power from said motor and controlled by said magnets adapted to vary said resistance to cause said motor to accelerate or retard said log and eliminate its slip.

15. A current-measuring device formed and mounted to accommodate itself to the direction of flow of a fluid current and comprising a member adapted to be exposed to said current and driven by the relative movement thereof, said member being formed and mounted to be sensitive to inequality of pressures upon its opposite sides, means controlled from said member adapted to indicate inequality of said pressures, and a source of power connected with said device and adapted to aid said current in driving the same.

16. In measuring apparatus, in combination, a rotary device comprising a part adapted to be exposed to the water upon its forward and rear surfaces and mounted to move with inequality of pressures on said surfaces, an auxiliary source of power coacting with the action of the water in driving said device, and means controlled from said part adapted to slacken the speed of said device upon the pressure on the rear surface of said part exceeding that on the forward surface thereof.

17. In apparatus of the class described, in combination, a member adapted to be exposed upon both sides to a fluid current and to be driven thereby, means controlled by inequality of fluid pressures upon the opposite sides of said member, and a source of power connected with said member and controlled by said last means to impart a varying driving force to said member.

18. In measuring apparatus, in combination, a rotary device comprising a propeller blade adapted to be exposed to the water upon its forward and rear surfaces, a source of power connected with said device and adapted to tend to drive the same, and means adapted upon the pressure of the water upon the rear surface of said propeller blade exceeding that upon the forward surface to decrease the driving tendency of said source of power.

19. In measuring apparatus, in combination, a rotary device comprising a propeller blade adapted to be exposed to the water upon its forward and rear surfaces, a source of power connected with said device and adapted to drive the same, and means adapted upon the pressure of the water upon the forward surface of said blade exceeding that upon the rear surface thereof to increase the driving tendency of said source of power.

20. In measuring apparatus, in combination, a rotary device so formed as to be rotated by a fluid current, an auxiliary source of power connected with said device and adapted to tend to drive the same, and pressure controlled means associated with said device and controlling the driving tendency of said source of power to eliminate slip of said device.

21. In apparatus of the class described, in combination, a rotary device, means controlled in accordance with the pressures upon portions of said device, and a source of power controlled by said last means and connected with the device to drive it at such rate as to turn through one revolution each time it travels its pitch distance with reference to the fluid in which it is positioned.

In testimony whereof I affix my signature, in the presence of two witnesses.

ROBERT S. BLAIR.

Witnesses:
ALBERT L. NATHAN,
H. M. SEAMANS.

Copies of this patent may be obtained for five cents each, by addressing the "Commissioner of Patents, Washington, D. C."